Patented Mar. 19, 1946

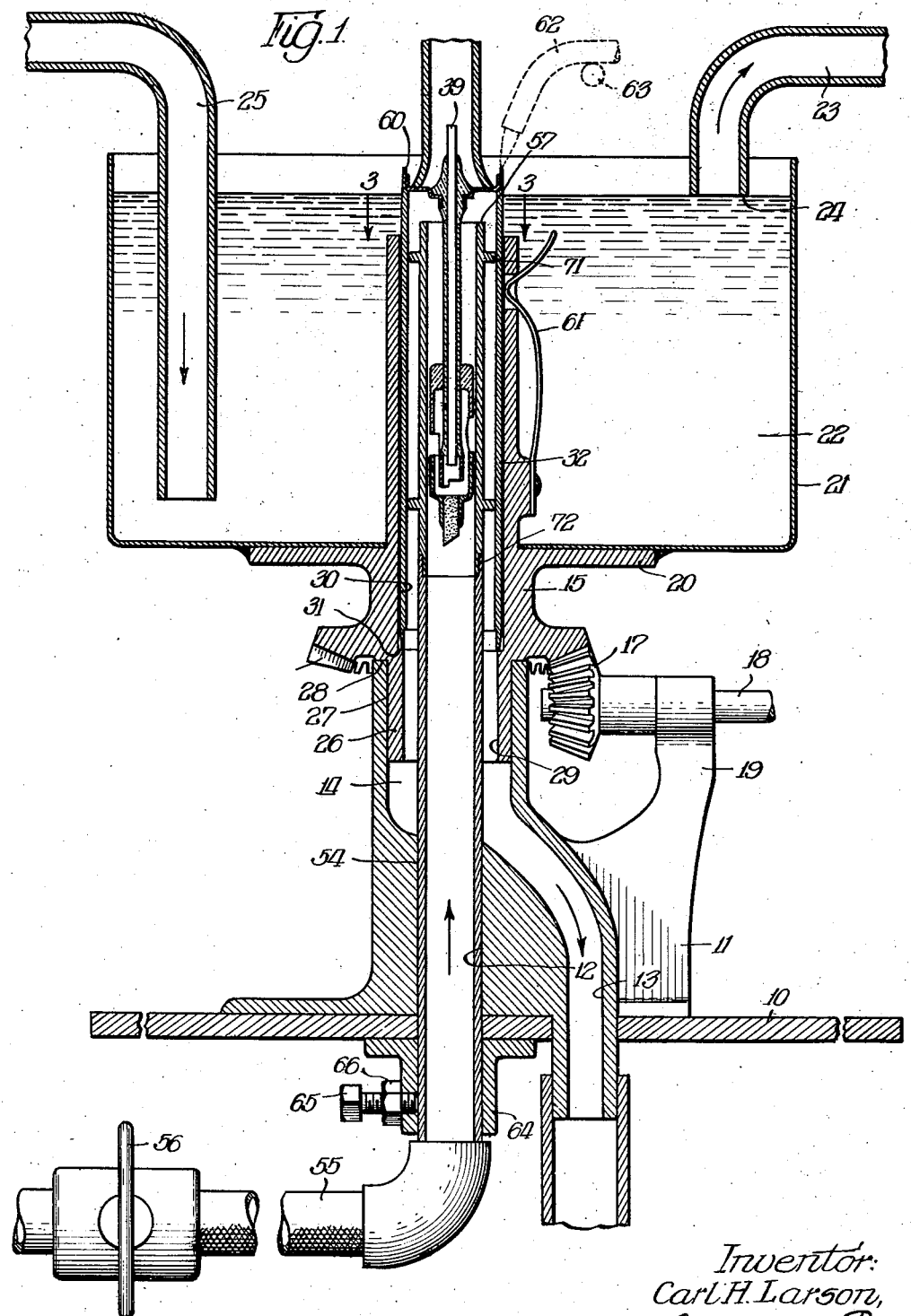

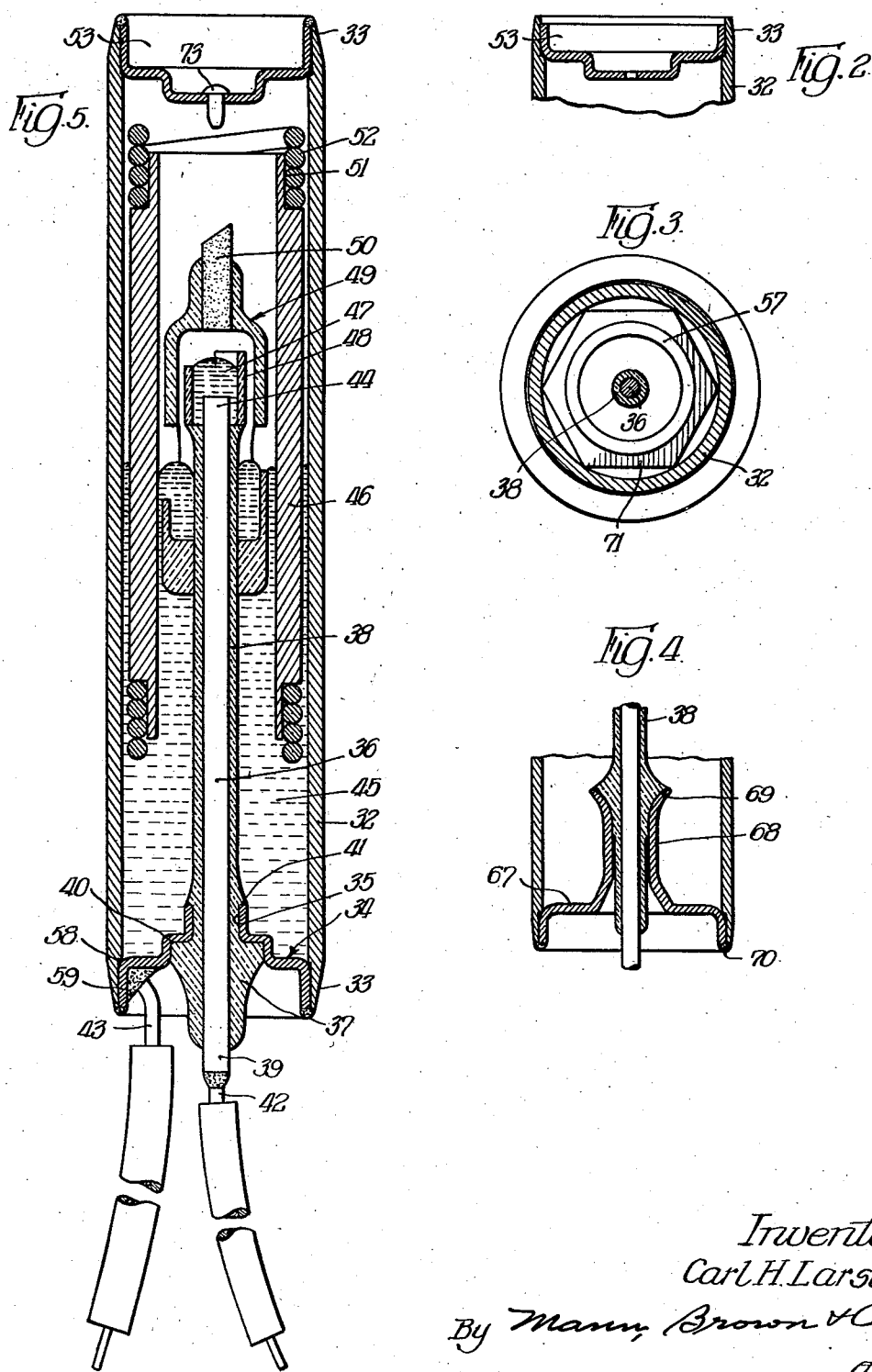

2,396,956

UNITED STATES PATENT OFFICE 2,396,956

APPARATUS FOR FABRICATING MERCURY SWITCHES AND THE LIKE

Carl H. Larson, Elkhart, Ind., assignor to The Adlake Company, a corporation of Illinois Application June 25, 1943, Serial No. 492,329

12 Claims. (Cl. 113—98)

In fabricating mercury switches using steel envelopes, it is important to have the envelopes hermetically sealed to withstand an internal gas pressure of a hundred pounds or more. It is preferable to use welding methods to seal the envelope but the fact that one of the electrodes which enters the envelop must be insulated from the base by glass or equivalent insulating material introduces a complication because the heat of welding will, unless proper precautions are taken, destroy the seal between the electrode and the switch envelope.

Heretofore, mechanical means had been used for crimping the margin of the switch envelope against the base but this method of sealing the envelope is not capable of withholding the high pressures which it is desirable to carry within the switch envelope.

The present invention, although directed primarily to apparatus for fabricating mercury switches using steel envelopes, is also applicable to other articles wherein it is desirable to heat join a base to a tubular envelope of some kind. It is particularly applicable where a portion of the base has an electrode or similar conductor sealed through the base with a heat sensitive sealing medium.

It is, therefore, one of the principal objects of the invention to provide apparatus for use in heat joining a base to a tubular envelope and more particularly provide such method and apparatus for use in the manufacture of metal envelope electrical devices which are necessarily hermetically sealed.

Other objects include the following: To provide apparatus which will accommodate switches or similar devices of different sizes for the making of a hermetic seal; to localize the application of heat during the operation of joining the base to the switch envelope and thereby protect adjacent parts of the switch from damage due to heat; to provide an apparatus which will operate satisfactorily for welding both ends of the switch structure onto the switch envelope; and to provide suitable adjusting devices to suit the application to the particular use for which the apparatus is being employed.

Further objects and advantages become apparent as the disclosure proceeds and the description is read in conjunction with the accompanying drawings in which:

Fig. 1 is a vertical cross sectional view through a preferred form of the apparatus;

Fig. 2 is a sectional view showing the switch top closure cap in place prior to welding;

Fig. 3 is a horizontal sectional view taken on the line 3—3 of Fig. 1;

Fig. 4 shows a slightly different method of sealing the electrode into the switch base; and Fig. 5 is a vertical sectional view through the illustrative form of a metal envelope mercury switch.

But the specific illustrations shown in the drawings and hereinafter described merely represent desirable forms in which the invention may be embodied and the appended claims should be construed as broadly as the prior art will permit.

In the preferred form of the invention, the apparatus is mounted on a platform 10 and consists of a base casting 11 having a vertical bore 12 and a side bore 13. The two bores merge at the top to form an enlarged chamber 14 adapted to receive the rotatable hollow hub 15 having downwardly facing gear teeth 16 adapted to mesh with a pinion 17 driven in a suitable manner at a relatively slow and controllable speed through the shaft 18 which is journalled in an arm 19 of the base casting 11.

The hub 15 is laterally extended at 20 to provide a seat for the tank 21 which is circular in form and rests upon and is secured to the seat 20. The tank is adapted to contain a cooling fluid 22 such as water, the level of which is maintained by an outlet tube 23 to which suction is applied to draw off any water above the bottom edge 24 of the tube. Water is admitted to the tank through an inlet pipe 25 which projects downwardly into the cooling fluid a substantial distance and which serves as a stirrer to maintain circulation of the water when the hub 15 and tank 21 are rotated.

Preferably, the base 11, hub 15 and tank 21, as well as all other parts of the apparatus which come in contact with the water, are made of brass to avoid corrosion.

The hub 15 has a vertical bearing 26 which fits into the machined bearing surface 27 provided at the upper portion of the base 11 and the weight of the hub and the tank structure is carried on a horizontal bearing 28.

The bore 29 of the hub 15 is enlarged above the bearing as shown at 30 to provide a seat 31 adapted to receive and support the tubular member which is to be heat joined to a base. The shoulder or ledge 31 may be raised to accommodate shorter switches by inserting spacer sleeves which rest upon the ledge 31 and provide an upper surface to receive the shorter switch envelope. When switch envelopes of smaller outside diameters are to be used in the apparatus, shim sleeves (not shown), preferably of metal to provide good heat conduction, are fitted into the bore 30 to provide an opening of the right size for the tubular member being worked upon. Hence, by the use of spacer sleeves to effectively raise the ledge 31 and by the use of shim sleeves to effectively reduce the inside diameter of the hub, switch envelopes or tubular members of varying size may be accommodated. Also, it is possible to provide different sized hubs 15 which can be interchangeably mounted on the base 11 to accommodate the switches of different sizes.

Before describing the method in which the apparatus is used to heat join a base to a tubular member, it will be helpful to understand the precise construction of an illustrative form of mercury switch which may be advantageously fabricated in the apparatus.

Referring, therefore, to Fig. 5, it will be seen that the switch comprises a tubular envelope 32 of non-magnetic material, preferably of 18-8 stainless steel, and having both ends of the envelope beveled off as indicated at 33. A base 34, preferably made of a material known as Kovar manufactured by the Stupakoff Ceramic and Manufacturing Company, Latrobe, Pennsylvania, is formed, by stamping, into a cup-shaped cap as shown and it has a central opening 35 through which an electrode 36 is sealed by a heat sensitive material, preferably either 733A or 704 glass made by the Corning Glass Works of Corning, New York. This material is found most advantageous because it has a coefficient of expansion substantially the same as the Kovar material of which the base 34 is preferably formed and substantially the same also as that of molybdenum which is the material preferably used for the electrode 36. However, other combinations of material may be used for the sealing of an electrode through a base but in any case, the sealing material is likely to be heat sensitive and must be protected when the base 34 is heat joined, as for example by torch welding, to the reduced end 33 of the switch envelope.

A glass sleeve 38 is telescoped over and fused to the electrode 36, and since the electrode material and glass are chosen with like coefficients of expansion, the glass will adhere to the electrode without cracking even under severe temperature changes. The glass sleeve 38 is enlarged near the lower end 39 of the electrode to form a bead 37 which, with the proper application of heat, may be firmly fused to the seat 40 of the base 34, with a portion of the glass overlaying and interlocked with the top margin 41 thereof, thus forming a strong and secure insulated bond for the electrode and the base 34.

Lead wires 42 and 43 are soldered to the electrode 36 and base 34, respectively, so that the switch envelope itself forms one side of an electrical circuit and the exposed end 44 of the electrode 36 forms the other side of the circuit. A ceramic cup 48 is fused to the top of the sleeve 38 and contains a body of mercury 47 which is in constant contact with the exposed end 44 of the electrode 36. A magnetically controlled displacer 46 is moved vertically within the envelope to shift the level of the main body of mercury 45, and when the mercury level rises sufficiently to cause mercury to flow over the top of the cup 48, the electrical circuit is closed, and when that condition does not exist, the circuit is open.

A time delay thimble, generally designated 49, is telescoped over the upper portion of the electrode 36 to delay the movement of mercury to and/or away from the mercury 47 in the cup 48 in proportion to the time required for gas to pass through the ceramic plug 50 mounted in the top of the thimble 49 to equalize the gas pressure differential caused by shifting of the mercury level by the displacer. Since the present invention is not concerned with the particular details of the time delay means, it will be sufficient to refer to Larson Patent No. 2,232,874 for a fuller disclosure of this structure.

The plunger or displacer 46 is preferably made of high grade magnetic iron and it is provided at both ends with a reduced portion 51 adapted to receive a non-magnetic steel spring 52 which is frictionally held on the reduced portion 51 of the displacer. The springs 52 may be made of the same material as the switch envelope 32; namely, 18-8 stainless steel in the austenitic form and the use of this material prevents the displacer 46 from adhering to the top closure 53 when it is made of cold rolled steel or other magnetic material.

In making up a metal switch of the type shown in Fig. 5, the electrode 36 is first fused to the insulating sleeve 38 and then the mercury cup 48 and time delay thimble are applied to the upper end of the electrode. The cap 34 is then slipped over the lower end of the insulated electrode and a bead is formed adjacent to the lower end 39. The electrode assembly is then inverted and the base 34 is drawn upwardly toward the end 39 of the electrode to be fused with and bonded to the bead formed at that end of the electrode. The complete sub-assembly consisting of the base 34 and the electrode bonded therethrough with the time delay structure mounted on the upper end of the electrode is then ready for being heat joined to the tubular envelope 32.

Referring again to Fig. 1, the tank 21 is first filled with water and it will overflow through the hub 15 into the drain outlet 13 in the base 11. Upon inserting a switch envelope blank 32 into the bore 30 of the hub, the water level will rise from the top of the hub 15 to the level determined by the position of the bottom edge 24 of the outlet tube 23, this level being designed to be slightly below the beveled end 33 of the envelope 32 and placing the exposed portion of the switch envelope immediately below the bevel in contact with the water in the tank. A tube 54 connected through a flexible hose 55 to a source of water supply, the volume of which is controlled by a valve 56, is then inserted through the bore 12 of the base 11 until its upper edge 57 is in the approximate position shown in Fig. 1 and then a small volume of water is permitted to flow through the tube 54 to provide a fountain effect at the top which will adequately bathe the lower portion of the electrode seal when the base assembly is slipped into place.

It will be seen in Fig. 5 that the ends of the switch envelope are counterbored, as shown at 58, to provide a seat which receives the base 34 and supports it in position. The outside diameter of the portion 59 of the base is made such that it has a light drive fit with the reduced ends of the envelope 32 so that when the base assembly is slipped into place for being welded to the envelope, it will securely hold its position. It will also be observed that the reduced end of the envelope 32 extends slightly above the top of the portion 59 of the base, as shown at 60 to facilitate the flow of metal from the envelope to the base for a strong and satisfactory weld.

The switch envelope is held in place within the hub 15 by a Phosphor bronze spring 61 and with the base assembly in place, as shown in Fig. 1, a welding torch, shown in dotted lines at 62 and which may be conveniently supported upon a rest 63, is applied to the upstanding mating edges of the envelope and the base while the tank, the hub, the switch envelope and the base are rotated slowly through the shaft 18. By holding the torch steady and by rotating the work an even weld can be consistently obtained while the heat of the weld is being held locally to the point of application. The water in the tank 21 effectively cools the exterior of the switch envelope while the water being passed upwardly through the tube 54 is directed against the glass seal and keeps it sufficiently cool so that heat travelling through the base from the weld will not fracture or disrupt the electrode seal. It has been found sufficient in protecting the external portion of the seal to provide a metal or ceramic wide mouthed shield which telescopes over the projecting end 39 of the electrode 36 and protects it from the direct flame of the torch.

The provision of means for supplying a copious quantity of cooling fluid to the underside of the base during the welding or other heat joining operation is of considerable importance because there is no convenient way to inspect the bond within the envelope after the base is affixed to the switch envelope.

A skilled operator will soon know how much water to have flow through the tube 54 and where to adjust the top 57 of the tube 54 in order to protect the seal during the heat joining operation. Preferably, the tube 54 passes through a gland 64 where it may be held in any desired vertical position by a set screw 65 locked in place by lock nut 66.

After the base assembly has been welded into place, the switch is removed from the hub and the excess water flows out through the top of the hub 15. The switch is then returned to its normal upright position, filled with mercury, pretested for operating characteristics and then placed back in the apparatus of this invention to have the top 53 welded into place. The method of welding the top 53 to the switch envelope is identical with that already described except that the tube 54 is removed as it must be to accommodate the switch base and the cooling of the switch during the welding operation is done entirely from the outside by the water 22 in the tank 21. Since there is no bond of heat sensitive material in the top, the outside cooling is adequate.

A modified form of seal for the electrode is shown in Fig. 4 and it consists of a base 67 having a neck 68 terminating in an outwardly flared throat 69 so that when a bead is formed on the glass sleeve 38 slightly above the point of application of the base and the base is slipped upwardly with the simultaneous application of heat to form the seal shown in Fig. 4, the actual juncture between the glass and the base 67 is substantially removed from the place where the base is welded to the envelope as shown at 70. Hence, the cooling of this bond during the welding operation by the water being passed upwardly through the tube 54 is more readily and more fully accomplished.

The spacing of the tube 54 from the interior wall of the switch envelope 32 (Fig. 1) may be accomplished in various ways, all that is required being that some form of spacer be employed to centrally locate the tube 54 within the hub so that the central electrode structure cannot be damaged by movement of the tube within the hub. In the form of the invention shown, the upper portion of the pipe 54 is formed of hexagonal bar stock and is turned down to leave spacers 71, as shown in Figs. 1 and 3. This section of the tube is then brazed to the lower portion of the tube as shown at 72.

There is sufficient room between the time delay thimble 49 and the inner walls of the tube 54 to accommodate the relatively small volume of flow which passes through the tube 54.

After a switch has been completely fabricated, with the exception of inserting the gas fill, it is placed in another machine where the gas fill is introduced through a loose fitting steel pin 73 (Fig. 5) which is welded into place when the proper gas fill has been introduced thereby completing a hermetic sealing of the entire switch envelope.

I claim:

1. In apparatus for affixing a metal base to a tubular steel envelope, the combination of a fluid tank containing a cooling fluid, a hollow rotatable hub projecting upwardly into the tank, means for supporting the envelope within the hub with the top portion of the envelope projecting slightly above the fluid level in the tank and with the portion immediately below in contact with said fluid, said projecting end of the envelope having a ledge adapted to receive and support the base whereby the base may be heat joined to the envelope, means for rotating the hub and envelope during the heat joining operation, and means for directing a stream of cooling fluid upwardly through the hub against the bottom side of the base during the heat joining operation.

2. In apparatus for affixing a base to a tubular switch envelope by the application of heat, said base being of the type having an electrode extending through the base and bonded therein with a heat sensitive sealing medium, the combination of a tank containing a cooling fluid, a hollow hub projecting upwardly into the tank, means for supporting the envelope in the hub with the upper portion slightly projecting above the fluid level and with the portion immediately below in contact with the fluid, said projecting end of the envelope having a ledge adapted to receive and support the base whereby the base may be heat joined to the envelope, and means for directing a stream of cooling fluid upwardly through the hub and envelope against the sealing medium at the electrode bond in the base.

3. In apparatus for affixing a base to a tubular switch envelope by the application of heat, said base being of the type having an electrode extending through the base and bonded therein with a heat sensitive sealing medium, the combination therewith of a hollow hub, means for supporting the envelope in the hub, said envelope having a surface adapted to receive and support the base, and means including a tube loosely telescoped within the hub and envelope for directing a stream of cooling fluid against the sealing medium on the inner face of the base when the base is being heat joined to the envelope and for causing it to be expelled through the space between the tube and the envelope.

4. In apparatus for affixing a base to a tubular switch envelope by the application of heat, said base being of the type having an electrode extending through the base and bonded therein with a heat sensitive sealing medium, the combination therewith of a hollow hub, means for supporting the envelope in the hub, said envelope having a surface adapted to receive and support the base, and means including a tube telescoped over the inwardly projecting portion of the electrode and telescoped loosely within the hub and the envelope for directing a stream of cooling fluid against the sealing medium on the inner face of the base when the base is being heat joined to the envelope and for causing it to be expelled through the space between the tube and the envelope, and a shield telescoped over the outwardly projecting portion of the electrode to protect the electrode bond while heat is being applied to unite the base with the envelope.

5. In apparatus for affixing a base to a tubular switch envelope by the application of heat, said base being of the type having an electrode extending through the base and bonded therein with a heat sensitive sealing medium, the combination therewith of a hollow hub, means for supporting the envelope in the hub, said envelope having a surface adapted to receive and support the base, and means including a tube loosely telescoped within the hub and envelope for directing a stream of cooling fluid against the sealing medium on the inner face of the base when the base is being heat joined to the envelope and for causing it to be expelled through the space between the tube and the envelope, and means for rotating the hub, the envelope and the base during the application of heat.

6. In apparatus for affixing a metal base to a tubular steel envelope, the combination of a fluid tank containing a cooling fluid, means for circulating fluid through the tank and for maintaining a constant level therein, a hollow hub projecting upwardly into the tank, means for supporting the envelope within the hub with the top portion of the envelope projecting slightly above the fluid level in the tank and with the portion immediately below in contact with said fluid, said projecting end of the envelope having a surface adapted to receive and support the base whereby the base may be heat joined to the envelope, and means for rotating the tank, the hub, the switch envelope and the base during the application of heat for joining the base to the envelope.

7. In apparatus for affixing a metal base to a tubular steel envelope, the combination of a fluid tank containing a cooling fluid, a hollow hub projecting upwardly into the tank, means for supporting the envelope within the hub with the top portion of the envelope projecting slightly above the fluid level in the tank and with the portion immediately below in contact with said fluid, said projecting end of the envelope having a surface adapted to receive and support the base whereby the base may be heat joined to the envelope, and means for directing a stream of cooling fluid upwardly through the hub against the bottom side of the base during the heat joining operation.

8. In apparatus for affixing a base to a tubular switch envelope by the application of heat, said base being of the type having an electrode extending through the base and bonded therein with a heat sensitive sealing medium, the combination therewith of a hollow hub, means for supporting the envelope in the hub, said envelope having a surface adapted to receive and support the base, and means including a tube telescoped over the inwardly projecting portion of the electrode and telescoped loosely within the hub and the envelope for directing a stream of cooling fluid against the sealing medium on the inner face of the base when the base is being heat joined to the envelope and for causing it to be expelled through the space between the tube and the envelope, said tube being removable from the hub.

9. In apparatus for affixing a base to a tubular switch envelope by the application of heat, said base being of the type having an electrode extending through the base and bonded therein with a heat sensitive sealing medium, the combination therewith of a hollow hub, means for supporting the envelope in the hub, said envelope having a surface adapted to receive and support the base, and means including a tube telescoped over the inwardly projecting portion of the electrode and telescoped loosely within the hub and the envelope for directing a stream of cooling fluid against the sealing medium on the inner face of the base when the base is being heat joined to the envelope and for causing it to be expelled through the space between the tube and the envelope, and means for adjusting the flow of cooling fluid through the tube.

10. In an apparatus of the class described for use in heat bonding an end member to a tubular envelope, the combination of a tank having an inner hollow hub portion whereby the tank confines an annular body of liquid surrounding said hub portion, means to support said envelope in said hub with the envelope extending above the top of the hub and fitting closely enough in the hub to maintain the liquid in the tank at a higher level than the hub, and means for circulating cooling fluid within said hub to cool the upper end of said envelope from the inside and to cool the inner face of said end member when the end member is positioned on the upper end of the envelope.

11. In an apparatus of the class described for use in heat bonding an end member to a tubular envelope, the combination of a tank having an inner hollow hub portion whereby the tank confines an annular body of liquid surrounding said hub portion, means to support said envelope at said hub with the top portion of the envelope extending above the liquid level in the tank, a tube positioned in said hub portion to extend into said envelope to define within the envelope an inner fluid passage and an outer annular fluid passage, and means for forcing fluid into one of said passages to return by the other of said passages for cooling the inside of the envelope.

12. In an apparatus of the class described for use in heat bonding an end member to a tubular envelope, the combination of a tank containing cooling liquid, means to support said envelope in position with the major portion of the envelope submerged in said liquid and a top portion of the envelope exposed for the heat bonding of said end member thereto, means to deliver a stream of the cooling liquid into said tank, means to draw off cooling liquid from the tank at a point to determine the maximum liquid level in the tank, means to rotate the tank about an axis extending through the tank, and means extending into the tank to impede the tendency of the liquid to rotate with the tank.

CARL H. LARSON.